United States Patent
Kosslyn et al.

(10) Patent No.: US 9,208,237 B2
(45) Date of Patent: Dec. 8, 2015

(54) PERSONALIZED CONTENT SUGGESTIONS FOR SUBSCRIBERS OF A CHANNEL OF A CONTENT SHARING PLATFORM

(71) Applicant: Google Inc., Mountain View, CA (US)

(72) Inventors: David Kosslyn, San Francisco, CA (US); Alexandra Conrads, San Francisco, CA (US); Josh Sassoon, San Francisco, CA (US); Stace Peterson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 264 days.

(21) Appl. No.: 13/754,171

(22) Filed: Jan. 30, 2013

(65) Prior Publication Data

US 2014/0215349 A1   Jul. 31, 2014

(51) Int. Cl.
*G06F 3/0481* (2013.01)
*G06F 17/30* (2006.01)
*G06Q 30/06* (2012.01)

(52) U.S. Cl.
CPC ...... *G06F 17/30867* (2013.01); *G06Q 30/0631* (2013.01)

(58) Field of Classification Search
USPC ......................................................... 715/745
See application file for complete search history.

(56) References Cited

U.S. PATENT DOCUMENTS

| | | | | |
|---|---|---|---|---|
| 8,499,250 B2 * | 7/2013 | Wetzer | ...................... | G06F 9/54 345/158 |
| 8,751,948 B2 * | 6/2014 | Wetzer | ..................... | G06F 9/542 455/414.2 |
| 8,819,726 B2 * | 8/2014 | Wetzer | ............. | H04N 21/25816 705/14.27 |
| 2003/0126600 A1 * | 7/2003 | Heuvelman | ........ | H04N 5/44543 725/35 |
| 2007/0083908 A1 * | 4/2007 | McCarthy | .......... | H04N 7/17318 725/112 |
| 2008/0139112 A1 * | 6/2008 | Sampath | ........... | G06F 17/30867 455/3.04 |
| 2009/0254856 A1 * | 10/2009 | Cwajbaum | ............. | G06Q 30/02 715/808 |
| 2009/0271820 A1 * | 10/2009 | Choi | ................... | H04N 7/17309 725/37 |
| 2010/0125544 A1 * | 5/2010 | Lee | .................... | H04N 7/17318 706/54 |
| 2010/0274815 A1 * | 10/2010 | Vanasco | ........... | G06F 17/30867 707/798 |
| 2010/0306659 A1 * | 12/2010 | Shahine | ................. | G06Q 30/02 715/733 |
| 2011/0107381 A1 * | 5/2011 | Solnik | ............... | G06Q 30/0251 725/93 |
| 2011/0173665 A1 * | 7/2011 | Shim | ..................... | H04H 60/72 725/46 |
| 2011/0219229 A1 * | 9/2011 | Cholas | ..................... | H04L 9/32 713/168 |
| 2011/0252132 A1 * | 10/2011 | Wetzer | .................... | G06F 9/542 709/224 |
| 2011/0320395 A1 * | 12/2011 | Dada | ...................... | G06Q 30/02 706/47 |
| 2012/0151509 A1 * | 6/2012 | McCarthy | .............. | H04H 20/38 725/9 |
| 2014/0164099 A1 * | 6/2014 | Schlesinger | ....... | G06Q 30/0277 705/14.43 |
| 2014/0366058 A1 * | 12/2014 | McCarthy | ......... | G06F 17/30893 725/37 |

* cited by examiner

*Primary Examiner* — Reza Nabi
(74) *Attorney, Agent, or Firm* — Lowenstein Sandler LLP (57) ABSTRACT

A method for providing personalized content suggestions for subscribers of a channel of a content sharing platform is disclosed. The method includes determining that a user accessing a page of a channel of a content sharing platform is a subscriber of the channel. The method also includes accessing a viewing history of the user, the viewing history identifying content items of the content sharing platform that have been accessed by the user. The method further includes providing a user interface on the page of the channel, the user interface tailored to the user and the channel based on the user being a subscriber of the channel and the accessed viewing history of the user.

18 Claims, 5 Drawing Sheets

PERSONALIZED CONTENT SUGGESTIONS FOR SUBSCRIBERS OF A CHANNEL OF A CONTENT SHARING PLATFORM

TECHNICAL FIELD

This disclosure relates to the field of multimedia content and, in particular, to personalized content suggestions for subscribers of a channel of a content sharing platform.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos. In some cases, the shared content is provided as streaming media. Streaming media is multimedia, such as video and audio content, which is received by and presented to an end-user while being delivered by a streaming provider.

Content sharing platforms may provide centralized locations for a content owner to showcase their content. These centralized locations are sometimes known as a channel. The channel may be presented by the content sharing platform via one or more channel pages. A channel may be used by a content owner as a central location for subscribed viewers to comment on content, find the latest updates, discover new content from the channel owner, and re-watch content they have already seen and liked. However, a problem arises in how to best craft an interface for the subscribed user to the channel that accomplishes the varied content discovery tasks that the subscribed user pursues.

There are a number of pieces of technology that exist around serving and selecting content to users. One technology is ranking technology, which determines the relevance of posts or social updates to a user, based on the user's social interactions with a social platform as suggested through the user's actions on a site of the social platform. The ranking technology uses a "stream" interface that features either chronological updates from a most recent to a least recent, or is fully personalized with a bias towards recency. However, this technology is tailored to a believed expectation of what the user is looking for. Another technology is tracking logic that remembers a user's place so that when the user returns at a later time they can begin where they left off. However, this technology largely consists of saving the user interaction history and using it directly, without any algorithmic adjustments.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for personalized content suggestions for subscribers of channel of content sharing platform is disclosed. The method includes determining that a user accessing a page of a channel of a content sharing platform is a subscriber of the channel. The method also includes accessing a viewing history of the user, the viewing history identifying content items of the content sharing platform that have been accessed by the user. The method further includes providing a user interface on the page of the channel, the user interface tailored to the user and the channel based on the user being a subscriber of the channel and the accessed viewing history of the user.

In one implementation, the user interface comprises a portion of the page and is located at a top section of the page. The page of the channel may be a document rendered in HyperText Markup Language (HTML). In some implementations, the method include generating an abbreviated version of an activity feed of the channel, and providing the generated abbreviated version of the activity feed in the user interface.

Furthermore, the method may also include determining, based on the accessed viewing history of the user, a predetermined number of content items associated with the channel that the user most recently viewed, and providing the predetermined number of content items in the user interface.

The method may also include determining, based on the accessed viewing history and metadata associated with content items of the accessed viewing history, one or more recommended content items for the user, and providing the determined one or more recommended content items in the user interface. This may include correlating the metadata of the content items to determine one or more preferences of the user, the one or more preferences utilized for the determining the one or more recommended content items. The metadata may be associated with the content items comprises at least one of a genre of the content item, keywords describing the content item, an episode number of the content item, or an author of the content item.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for providing personalized content suggestions for subscribers of a channel of a content sharing platform. In one implementation, a user interface is provided on a portion of a page of the channel, where the user interface is tailored to a user that subscribes to the channel. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

In one implementation of the disclosure, when the user is determined to be a subscriber to the channel, a subscriber user interface is generated for display on at least a portion of the channel. The subscriber user interface may present a welcome back section including content from the channel that is tailored to the user. For example, the welcome back section may include a recommended content item section, a recently watched section, and a recent activity section. In some implementations, statistics associated with the user, such as the user's viewing history, user likes, user subscriptions, and so on, may be utilized to generate the subscriber user interface. The content sharing platform may generate the subscriber user interface on behalf of an owner of the channel, without the owner's involvement. In other implementations, the channel owner may provide some input, such as identifying a type of content of the channel, to the content sharing platform that contributes to the generation of the subscriber user interface by the content sharing platform on the channel owner's behalf.

In one implementation, a method for providing personalized content suggestions for subscribers of channel of content sharing platform is disclosed. The method includes determining that a user accessing a page of a channel of a content sharing platform is a subscriber of the channel. The method also includes accessing a viewing history of the user, the viewing history identifying content items of the content sharing platform accessed by the user. The method further includes providing a user interface on the page of the channel, the user interface tailored to the user and the channel based on the accessed viewing history of the user.

Previously, accessing a user's history of actions as a consumer on a content sharing platform occurred outside of a content owner's channel page and associated content areas. Implementations of the disclosure allow a content creator to have a portion of their channel page include a subscriber user interface that the content sharing platform populates. This subscriber user interface may be based on the individual user, and may show the user their most recent activity with respect to content from a channel owner.

Figure 1:
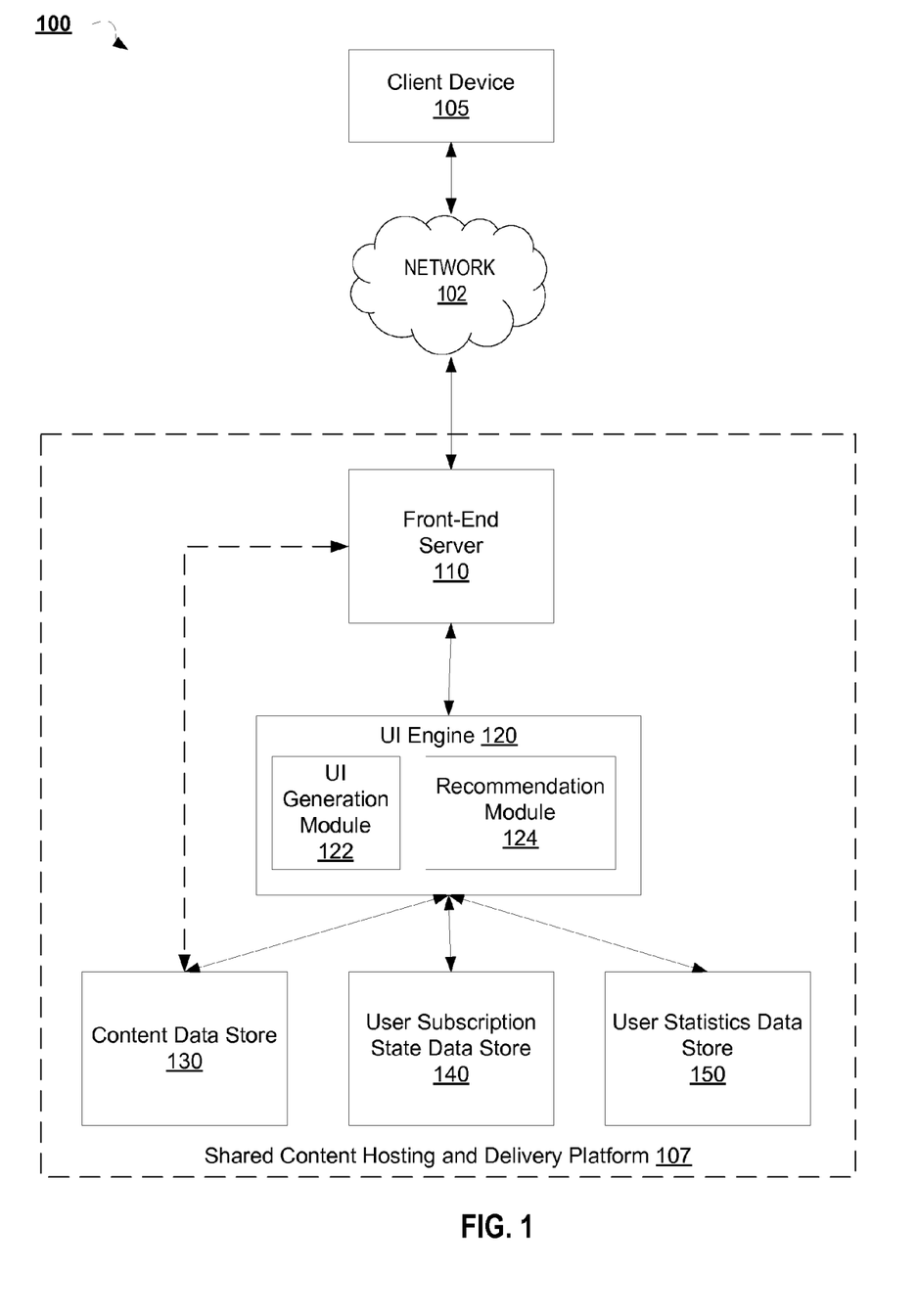
FIG. 1 is a block diagram illustrating an exemplary network architecture in which implementations of the disclosure may be implemented.

FIG. 1 is a block diagram illustrating an exemplary network architecture 100 in which implementations of the disclosure may be implemented. The network architecture 100 includes a client device 105 communicably coupled to a shared content hosting and delivery platform 107 via a network 102. In some implementations, content hosting and delivery platform 107 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

As illustrated, shared content hosting and delivery platform 107 includes front-end server 110, a user interface (UI) engine 120, a content data store 130, a user subscription state data store 140, and a user statistics data store 150. A data store may include, but is not limited to, a table, a database, a directory, a repository, and one or more files, to name a few examples. One or more client devices 105 may be in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, network architecture 100 may support a large number of concurrent sessions with many client devices 105.

Shared content hosting and delivery platform 107 is capable of operating within a single server device or on multiple server devices. For example, although each of front-end server 110, UI engine 120, content data store 130, a user subscription state data store 140, and user statistics data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of network architecture 100, a user may access shared content hosting and delivery platform 107 via client device 105 over network 102. The front-end server 110 receives communications from the client device 105, and processes and/or directs these communications accordingly. In one implementation, the front-end server 110 comprises a processing device and a computer-readable memory.

Front-end server 110 is communicably coupled to UI engine 120, which may reside on the same machine as front-end server 110 or a different machine. UI engine 120 may be implemented in hardware, software, firmware, or any combination of the above. In implementations of the disclosure, UI engine 120 provides personalized content suggestions for subscribers of channels of a content sharing platform. In one implementation, UI engine 120 includes a UI generation module 122 and a recommendation module 124.

In one implementation, UI generation module 122 provides a subscriber user interface for each channel page of the shared content hosting and delivery platform 107, where the subscriber user interface is based on a subscription state of the user accessing the channel page being a subscribed user to the channel. A channel page is a document, or set of documents, (e.g., rendered in HyperText Markup Language (HTML)) provided by the shared content hosting and delivery platform 107 that may be used by a content owner to showcase content items owned by the content owner. The channel page may be used by the content owner to convince new viewers to subscribe to the channel, as well as to provide a central location for subscribed viewers to comment on a content owner's content, find the latest updates, and discover new content from the content owner.

As discussed above, a channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

When a user accesses a channel page of the shared content hosting and delivery platform 107, the UI generation module 122 first determines a subscription state of the user. In one implementation, the subscription state of a user is either subscribed to the channel or not subscribed (also referred to as non-subscribed, unsubscribed, etc.) to the channel. In one implementation, the UI generation module 122 may reference login credentials of the user with subscription data stored in the user subscription state data store 140. The user subscription state data store 140 may maintain listings or data structures identifying the particular channel subscriptions of each user of the shared content hosting and delivery platform 107.

In one implementation, when it is determined that a user accessing a page of a channel is a subscriber of the channel, a version of the user interface (e.g., UI) for the channel page is provided by the UI generation module 122 for the subscribing user. This version of the user interface, which may be referred to as a subscriber user interface, may include a "welcome back" section, featuring latest updates from the channel and/or one or more videos from the channel recommended to the user. In one implementation, the subscriber user interface may include different areas tailored to the subscriber. These areas may include, but are not limited to, a recommended content section, a recent activity section, and a recently watched section.

The recommended content section may be generated by the recommendation module 124 by using a variety of statistics associated with the user as inputs to a function that generates a personalized set of recommendations for the user. For example, the statistics may include, but are not limited to, the user's watch history, likes, subscriptions, and general activity across the shared content hosting and delivery platform 107. The statistics may be collected by the shared content hosting and delivery platform 107 when users perform actions (e.g., view a content item, like a content item, subscribe to a channel, posting a message, and so on) with respect to the platform 107, and then stored in the statistics data store 150 for later reference. In one implementation, these statistics may then be obtained by the recommendation module 124 from the statistics data store 150 of the shared content hosting and delivery platform 107.

The user's viewing history with respect to the channel and with respect to the overall shared content hosting and delivery platform 107 may be considered by the recommendation module 124. When analyzing the user's viewing history to determine preferences of the viewer, the recommendation module 124 may utilize metadata associated with the content items to make comparisons and contrasts between previously-viewed content items and potential content items (not yet viewed by the user) for recommendation. In one implementation, the metadata associated with the content items includes, but is not limited to, a genre of the content item, keywords describing the content item, an episode number of the content item, an author of the content item, and so on.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Each of the recommended content items selected by recommendation module 124 are content items that come from the channel (e.g., content items generated by the channel owner). Furthermore, the order of display of the recommended content items may be determined by the above-described functions performed by recommendation module 124. For example, if a channel includes episodic content items, then the function of the recommendation module 124 may take the user's viewing history into account in order to recommend the next unwatched episode to the user.

In some implementations, the channel owner provides an input or preference indicating a content item to be placed in the recommended content section. The recommendation module 124 may take this input from the channel owner into account. However, if the user's viewing history indicates that the channel owner's designated content item has already been viewed by the user, then the recommendation module 124 defaults back to its general function to select recommended content.

The recent activity may be a snapshot of a channel's larger "feed" or activity stream. Whenever a channel publishes an action to a feed of the channel (e.g., uploading a video, liking a video, posting a message, subscribing to a channel, etc), this action may show up in the recent activity section as the most recent channel activity. In one implementation, the user can click on a title listed in the subscriber user interface to be taken to an entire "feed" view of the channel that features all activities, and not just the most recent ones.

The recently watched section may include content the user has recently viewed from this channel. The recently watched content may either be ordered by recency (e.g., listing the user's last watched content item from the channel first) or personalized based on what the recommendation module 124 estimates that the user prefers (e.g., if the user repeatedly watches the same content item from a channel).

In one implementation, an administrator of the shared content hosting and delivery platform 107 may configure how many content items are selected for display in each section of the subscriber user interface. In other implementations, the content owner of the channel may configure such settings. In some implementations, the user viewing the channel page that is not a subscriber to the channel may select an option to view the subscriber user interface described above.

The channel owner may have some control over selecting which content items of the channel are highlighted in the subscriber user interface, such as by indicating a single content item that should be shown in the recent activity section, and so on. Furthermore, the channel owner may have an option to select whether the subscriber user interface is on (shown to subscribers) or off (not shown to subscribers) for the page of the channel.

In implementations of the disclosure, the user interface for subscribed users described above is generated by the shared content hosting and delivery platform 107 on behalf of the channel owner. In other words, the shared content hosting and delivery platform 107 generates a personalized recommendation for each subscribed user and surfaces this recommendation inside of a page of channel, in what is traditionally the channel owner's space on the shared content hosting and delivery platform 107, on behalf of the channel owner.

Although the above descriptions of implementations of the disclosure describe the subscriber user interface on a channel level, other implementations are also possible. For example, the subscriber user interface described above may be shown at a topic level, so that groups of channels are provided a page with the subscriber user interface generated as discussed above for this group of channels.

In one implementation, the subscriber user interface may reside in a top section of the channel page. For example, the subscriber user interface may reside beneath a header image presenting a logo of the channel, in order to immediately catch the view of the user accessing the channel page. Content that is directly controlled by the content owner of the channel page may then be presented below the subscriber user interface.

Figure 2:
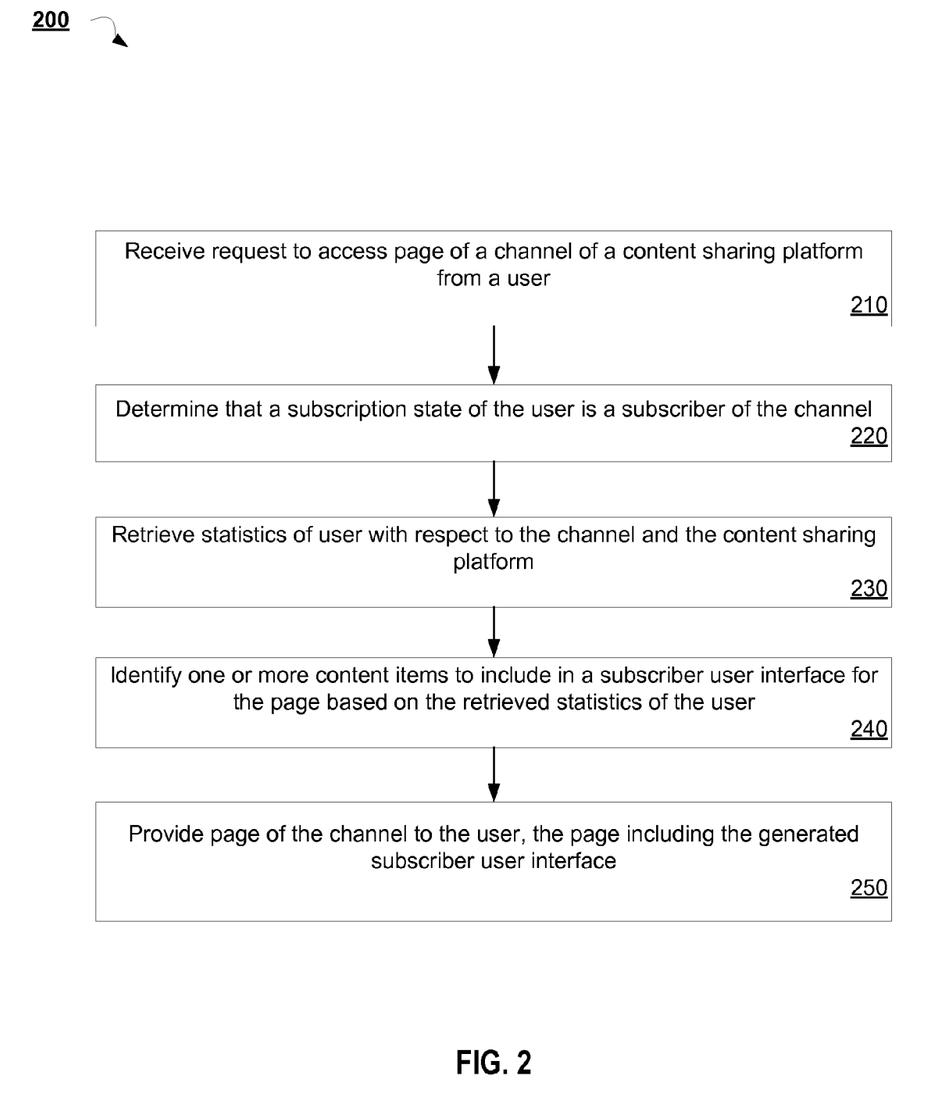
FIG. 2 is a flow diagram illustrating a method for providing personalized content suggestions for subscribers of a channel of a content sharing platform according to an implementation of the disclosure.

FIG. 2 is a flow diagram illustrating a method 200 for providing personalized content suggestions for subscribers of a channel of a content sharing platform according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by UI engine 120 of shared content hosting and delivery platform 107, as shown in FIG. 1.

Referring to FIG. 2, at block 210, method 200 begins when a request is received to access a page of a channel of a content sharing platform. The request is received from a user of the content sharing platform that is accessing the page. A channel page may include a document, or set of documents, (e.g., rendered in HTML) provided by the content sharing platform to showcase content items owned by a content owner of the channel. The channel page may be used by the content owner to provide a central location for subscribed viewers to comment on a content owner's content, find the latest updates, and discover new content from the content owner.

At block 220, a subscription state of the user accessing the channel page is determined to be a subscriber to the channel. In one embodiment, login credentials of the user may be cross-referenced against a subscription state data store to determine the subscription state of the user with respect to the channel. Then, at block 230, statistics associated with the user are retrieved. In one implementation, the statistics relate to the user's viewing history with respect to the channel and with respect to the content sharing platform as a whole. In addition, the user's statistics may include indications of the user's preferences (e.g., "likes") and other channel subscriptions.

At block 240, one or more content items from the channel are identified to include in a subscriber user interface for the page of the channel. In one implementation, the one or more content items are identified based on the retrieved statistics for the user. Then, at block 250, a page of the channel is provided to the user, where the page includes the generated subscriber user interface. In one implementation, the subscriber user interface is provided in a top section of the page in order to increase the likelihood that is one of the first items viewed on the page by the user.

Figure 3:
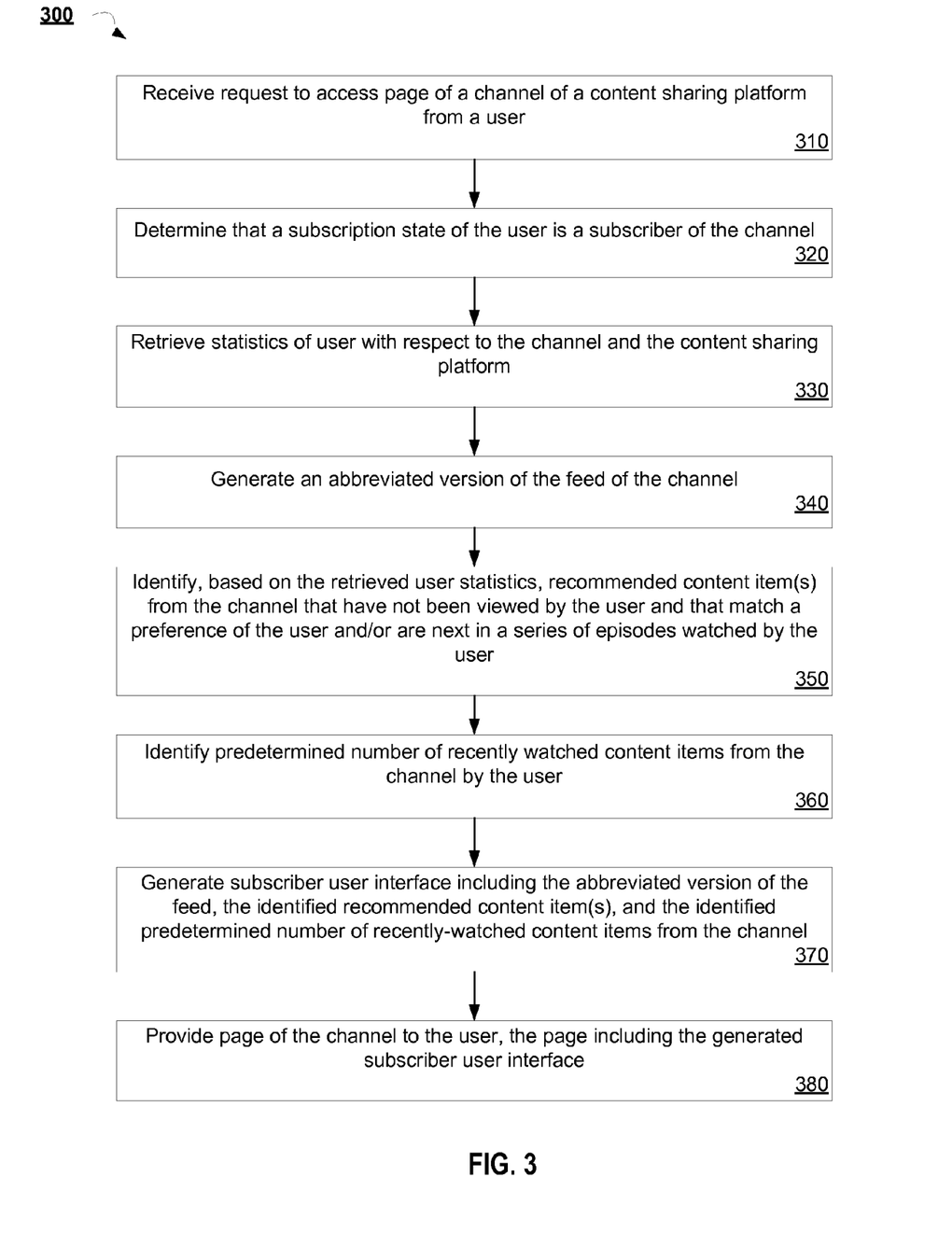
FIG. 3 is a flow diagram illustrating another method for providing personalized content suggestions for subscribers of a channel of a content sharing platform according to an implementation of the disclosure.

FIG. 3 is a flow diagram illustrating another method 300 for providing personalized content suggestions for subscribers of a channel of a content sharing platform according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by UI engine 120 of a shared content hosting and delivery platform 107, as shown in FIG. 1.

Referring to FIG. 3, blocks 310-330 are the same as blocks 210-230 described with respect to FIG. 2, and a similar description is applicable to FIG. 3. At block 340, an abbreviated version of a feed of the channel is generated for a user that is a subscriber of the channel. In one implementation, the abbreviated version includes a predetermined number of the most recent activities performed in association with the channel. These activities may include actions taken by the channel owner, actions taken by other subscribed users with respect to the channel (e.g., comments, likes, etc.), or actions taken by the viewing subscribed user with respect to the channel. An administrator of the content sharing platform may configure the predetermined number of activities that are included in the abbreviated version of the feed.

At block 350, one or more content items from the channel are identified for a personalized recommendation to the user. In one implementation, the recommendation is personalized by selecting the content items based on the retrieved statistics of the user. The identified content items should not have been viewed by the user and may match a set of preferences of the user derived from the retrieved statistics of the user. In some implementations, the identified content items may include one or more content items that are next in a series of episodes of the channel that have not been viewed by the user yet.

Subsequently, at block 360, a predetermined number of recently-watched content items are identified. In one implementation the recently-watched content items are those content items from the channel that were most recently viewed by the user. In some implementations, instead of most recently watched content items, a list of content items frequently viewed by the user from the channel may be identified. Viewing history statistics maintained by the content sharing platform may be referenced to determined which content items associated with the channel are most frequently viewed by the user. The predetermined number may be selected and configured by an administrator of the content sharing platform.

At block 370, a subscriber user interface is generated. In one implementation, the subscriber user interface includes the abbreviated version of the channel feed, the identified recommended content items, and the identified predetermined number of recently-watched content item. In some implementations, a subset of the above-described sections may be shown in the subscriber user interface. In other implementations, other sections than those described above may be included in the subscriber user interface. Lastly, at block 380, the page of the channel is provided to the user, where the page includes the generated subscriber user interface from block 370. In one implementation, the subscriber user interface is provided with the page along with a variety of other content that is directly selected and controlled by a content owner of the channel. The page may be rendered by a device of the user in HTML.

Figure 4:
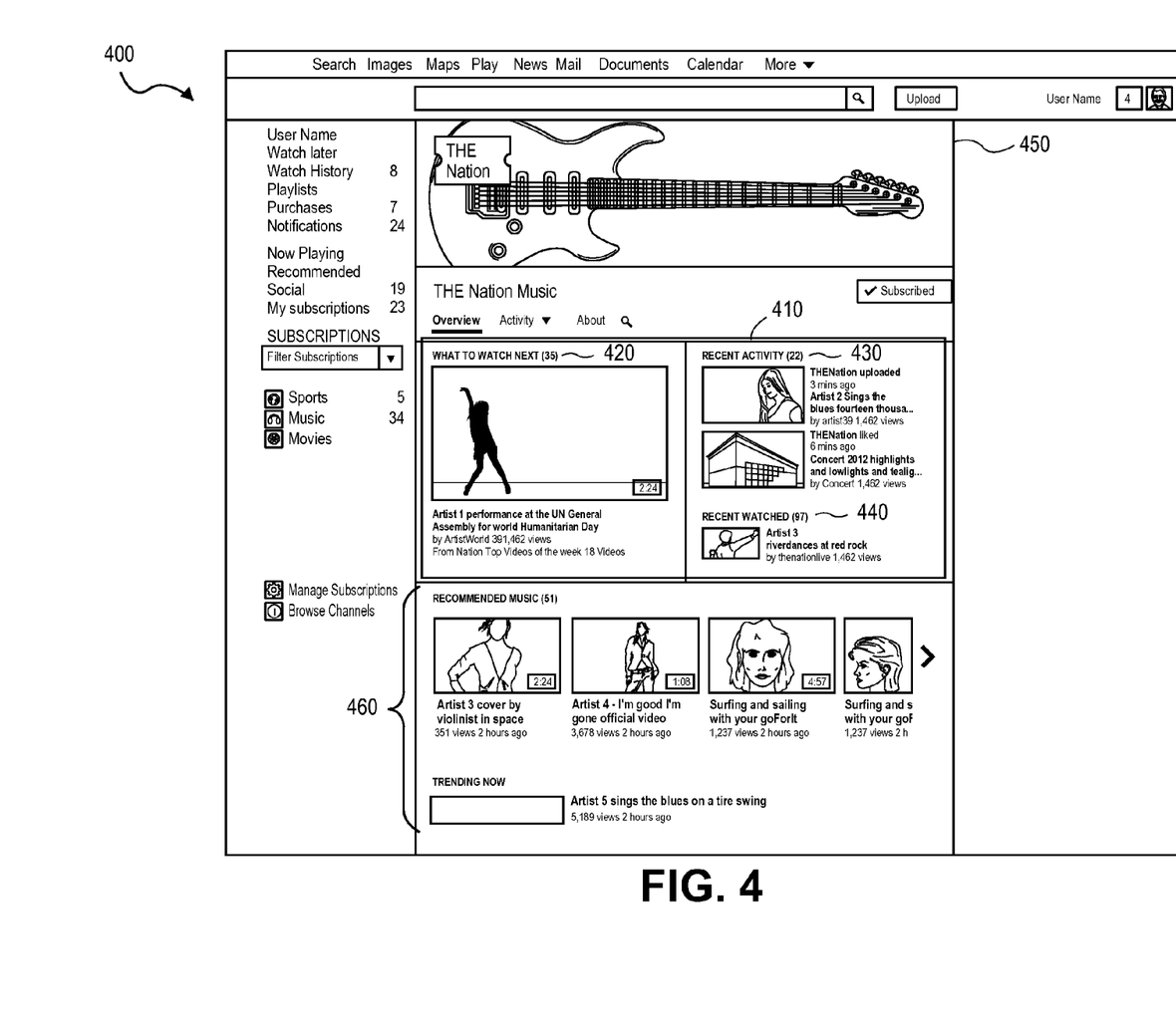
FIG. 4 is a block diagram illustrating an example user interface (UI) providing personalized content suggestions for subscribers of a channel of a content sharing platform according to some implementations.

FIG. 4 illustrates an example screenshot of a channel page UI 400 providing personalized content suggestions for subscribers of a channel of a content sharing platform according to implementations of the disclosure. FIG. 4 illustrates an example screenshot of a channel page UI 400 provided to a user viewing a channel page of a content sharing platform. In one implementation, the user is subscribed to the channel associated with the channel page UI 400.

Channel page UI 400 may include a subscriber UI 410 generated and personalized for the subscribed user. The subscriber UI 410 includes a recommended content items section 420, a recent activity section 430, and a recently watched section 440. The sections 420, 430, 440 may be generated as described above with respect to FIG. 1. As illustrated, the subscriber UI 410 is located in a top section of the page.

The channel page UI 400 may also includes items, such as a header 450 and page content 460, that are controlled by the owner of the channel page. The page may also include columns and other side bars that provide menus for navigation and shortcuts to the overall content sharing platform. These columns and side bars may not be specific to the channel page UI 400.

Figure 5:
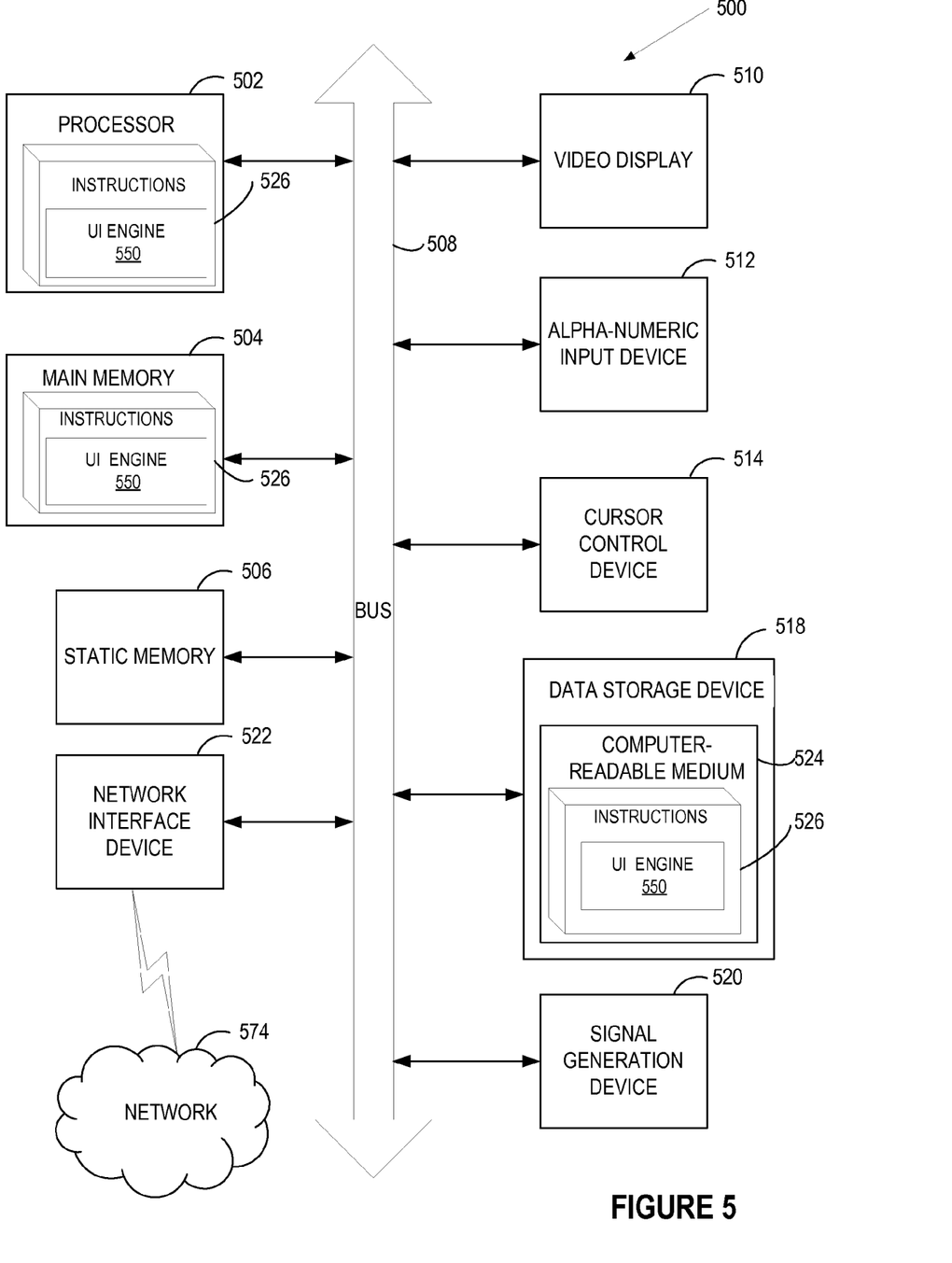
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a UI engine 550, which may correspond to UI engine 120 of FIG. 1, and/or a software library containing methods that call a UI engine for providing personalized content suggestions for subscribers of a channel of a content sharing platform. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A non-transitory machine-readable storage medium storing instructions which, when executed, cause a processing device to perform operations comprising:
   receiving, by the processing device, a user request identifying a channel of a plurality of channels of a content sharing platform, the plurality of channels to be presented to a user via channel graphical user interfaces (GUIs) providing information about respective channels of the content sharing platform, wherein the user request is responsive to user input;
   determining, by the processing device, that the user is subscribed to the channel identified in the user request;
   determining, based on a viewing history of the user, a predetermined number of content items associated with the channel, the predetermined number of content items comprising content items that the user recently viewed;
   determining, based on the viewing history and metadata associated with content items of the viewing history, one or more recommended content items for the user;
   generating an abbreviated version of an activity feed of the channel, the abbreviated version comprising a shorter version of the activity feed; and
   modifying, in response to the user being a subscriber of the channel, a channel GUI of the channel to comprise the predetermined number of content items, the one or more recommended content items, and the abbreviated version of the activity feed, wherein the channel GUI of the channel is modified for presentation to the user in response to the user request identifying the channel, wherein the channel GUI of the channel is associated with an owner of the channel, and wherein the one or more recommended content items comprises a content item specified by the owner of the channel for inclusion in the one or more recommended content items presented in a portion of the channel GUI of the channel.

2. The non-transitory machine-readable storage medium of claim 1, wherein modifying the channel GUI comprises modifying the portion of the channel GUI that is located at a top section of the channel GUI.

3. The non-transitory machine-readable storage medium of claim 1, wherein the one or more recommended content items comprise a content item that is next in a series of episodes of content items of the channel, wherein the user has not viewed the content item that is next.

4. The non-transitory machine-readable storage medium of claim 1, further comprising correlating the metadata of the content items to determine one or more preferences of the user, the one or more preferences utilized for the determining the one or more recommended content items.

5. The non-transitory machine-readable storage medium of claim 1, wherein the metadata associated with the content items comprises at least one of a genre of the content item, keywords describing the content item, an episode number of the content item, or an author of the content item.

6. The non-transitory machine-readable storage medium of claim 1, wherein the channel GUI comprises a document rendered in HyperText Markup Language (HTML).

7. A method comprising:
receiving, by a processing device, a user request identifying a channel of a plurality of channels of a content sharing platform, the plurality of channels to be presented to a user via channel graphical user interfaces (GUIs) providing information about respective channels of the content sharing platform, wherein the user request is responsive to user input;
determining, by the processing device, that the user is subscribed to the channel identified in the user request;
determining, based on a viewing history of the user, a predetermined number of content items associated with the channel, the predetermined number of content items comprising content items that the user recently viewed;
determining, based on the viewing history and metadata associated with content items of the viewing history, one or more recommended content items for the user;
generating an abbreviated version of an activity feed of the channel, the abbreviated version comprising a shorter version of the activity feed; and
modifying, in response to the user being a subscriber of the channel, a channel GUI of the channel to comprise the predetermined number of content items, the one or more recommended content items, and the abbreviated version of the activity feed, wherein the channel GUI of the channel is modified for presentation to the user in response to the user request identifying the channel, wherein the channel GUI of the channel is associated with an owner of the channel, and wherein the one or more recommended content items comprises a content item specified by the owner of the channel for inclusion in the one or more recommended content items presented in a portion of the channel GUI of the channel.

8. The method of claim 7, wherein modifying the channel GUI comprises modifying the portion of the channel GUI that is located at a top section of the channel GUI.

9. The method of claim 7, wherein the one or more recommended content items comprise a content item that is next in a series of episodes of content items of the channel, wherein the user has not viewed the content item that is next.

10. The method of claim 7, further comprising correlating the metadata of the content items to determine one or more preferences of the user, the one or more preferences utilized for the determining the one or more recommended content items.

11. The method of claim 7, wherein the metadata associated with the content items comprises at least one of a genre of the content item, keywords describing the content item, an episode number of the content item, or an author of the content item.

12. The method of claim 7, wherein the channel GUI comprises a document rendered in HyperText Markup Language (HTML).

13. A system comprising:
a memory; and
a processing device, coupled to the memory, to:
receive a user request identifying a channel of a plurality of channels of a content sharing platform, the plurality of channels to be presented to a user via channel graphical user interfaces (GUIs) providing information about respective channels of the content sharing platform, wherein the user request is responsive to user input;
determine that the user is subscribed to the channel identified in the user request;
determine, based on a viewing history of the user, a predetermined number of content items associated with the channel, the predetermined number of content items comprising content items that the user recently viewed;
determine, based on the viewing history and metadata associated with content items of the viewing history, one or more recommended content items for the user;
generate an abbreviated version of an activity feed of the channel, the abbreviated version comprising a shorter version of the activity feed; and
modify, in response to the user being a subscriber of the channel, a channel GUI of the channel to comprise the predetermined number of content items, the one or more recommended content items, and the abbreviated version of the activity feed, wherein the channel GUI of the channel is modified for presentation to the user in response to the user request identifying the channel, wherein the channel GUI of the channel is associated with an owner of the channel, and wherein the one or more recommended content items comprises a content item specified by the owner of the channel for inclusion in the one or more recommended content items presented in a portion of the channel GUI of the channel.

14. The system of claim 13, wherein the processing device is to modify the channel GUI by modifying the portion of the channel GUI that is located at a top section of the channel GUI.

15. The system of claim 13, wherein the one or more recommended content items comprise a content item that is next in a series of episodes of content items of the channel, wherein the user has not viewed the content item that is next.

16. The system of claim 13, wherein the processing device is to correlate the metadata of the content items to determine one or more preferences of the user, the one or more preferences utilized for the determining the one or more recommended content items.

17. The system of claim 13, wherein the metadata associated with the content items comprises at least one of a genre of the content item, keywords describing the content item, an episode number of the content item, or an author of the content item.

18. The system of claim 13, wherein the channel GUI comprises a document rendered in HyperText Markup Language (HTML).

* * * * *